United States Patent
Kobayashi et al.

Patent Number: 5,388,169
Date of Patent: Feb. 7, 1995

[54] OPTICAL WAVEGUIDE TYPE SYNAPTIC WEIGHT MODULATOR WITH NEMATIC LIQUID CRYSTAL CLADDING

[75] Inventors: Shunsuke Kobayashi, Tokyo; Yasufumi Iimura, Asaka; Chen B. Xue, Tanashi, all of Japan

[73] Assignee: Tokyo University of Agriculture and Technology, Fuchu, Japan

[21] Appl. No.: 165,894

[22] Filed: Dec. 14, 1993

[30] Foreign Application Priority Data

Apr. 26, 1993 [JP] Japan ................................. 5-099514

[51] Int. Cl.⁶ ............................ G02B 6/20; G02F 1/13
[52] U.S. Cl. .......................................... 385/2; 359/42; 359/84; 385/125; 385/144
[58] Field of Search ............................. 385/1–10, 385/123, 125, 141, 144, 145; 359/36, 42, 84, 93, 94, 102, 106

[56] References Cited

U.S. PATENT DOCUMENTS

| | | | |
|---|---|---|---|
| 4,737,014 | 4/1988 | Green | 385/2 X |
| 5,106,181 | 4/1992 | Rockwell, III | 385/2 |
| 5,172,257 | 12/1992 | Patel | 359/84 |

FOREIGN PATENT DOCUMENTS

02-293715  12/1990  Japan.

*Primary Examiner*—John D. Lee
*Attorney, Agent, or Firm*—Spencer, Frank & Schneider

[57] ABSTRACT

The present invention relates to an optical waveguide type synaptic weight modulator with a nematic liquid crystal cladding layer. The modulator can be used for optronics and optical neural computing. The modulator includes a multichannel waveguide provided on a glass substrate, electrodes which are provided on the glass substrate and which sandwich the channels of the waveguide, a nematic liquid crystal cladding layer provided perpendicularly to the waveguide and electrodes, a control power supply connected to the electrodes, a light source prism coupled to the waveguide, and a multimode fiber end surface coupling an output of the waveguide to a photomultiplier. The nematic liquid crystal cladding layer provides an electrooptical effect and is fixed by an orientation film. Weights are added to each signal in the same manner as the synaptic action of a neural circuit by controlling the power distribution of an input signal consisting of a combination of different waveguide modes by an electric deflection effect with respect to a liquid crystal molecular direction.

4 Claims, 4 Drawing Sheets

OPTICAL WAVEGUIDE TYPE SYNAPTIC WEIGHT MODULATOR WITH NEMATIC LIQUID CRYSTAL CLADDING

BACKGROUND OF THE INVENTION

1. Field of the Invention

The present invention relates to an optical waveguide type synaptic weight modulator with a nematic liquid crystal cladding layer. The modulator adds weights, in the same manner as the synaptic action of a neural circuit, to an input signal consisting of a combination of different waveguide modes. The liquid crystal cladding layer is provided on a multimode channel waveguide and the modulation is controlled by an electric deflection effect with respect to a liquid crystal molecular direction. The present invention is to provide an optical waveguide type synaptic weight modulator used for optoelectronics and optical neural computing.

2. Description of the Related Art

Aiming at realization of optical space modulation having large-scale parallel processability and a self learning organizing function as required for optical neural computing, there have hitherto been proposed a vector-matrix learning operation system using a ferroelectric liquid crystal panel, an associative memory system using a hologram or a phase-conjugate mirror, and the like.

The prior art effectively utilizes parallelism, high speed and the noninductiveness of light, but light has no polarity in the electrical sense and cannot express a negative value. Furthermore there are no sufficient solutions for disadvantages such as an optical system is difficult to miniaturize, susceptible to vibration, hard to transport, and the like. Moreover, there are few clear and ideal techniques for improvement.

SUMMARY OF THE INVENTION

An object of the present invention is to provide an optical waveguide type synaptic weight modulator with a nematic liquid crystal cladding layer, which modulator can be used for constructing a neural network of an optical neural computer with the use of an optical waveguide system which is strong with respect to vibration and easy to transport.

The present invention relates to an optical waveguide type synaptic weight modulator with a nematic liquid crystal clad comprising a multichannel waveguide provided on a glass substrate with an input terminal at one end and an output terminal at the other end, electrodes provided on said glass substrate by sandwiching the waveguide, a nematic liquid crystal cladding layer provided perpendicularly to the waveguide and electrodes, a control power supply connected to said input terminal of the electrode, a light source coupled with prism to the waveguide, and a photonmultiplier tube having multimode fiber end surface coupling connected to the output terminal, wherein said nematic liquid crystal cladding layer constitutes a nematic liquid crystal layer used as electrooptical effect functioning material on the multimode channel waveguide provided on said glass substrate fixed by an orientation film formed on the nematic liquid crystal cladding layer and the glass substrate, and weights are added respectively to each signal in the same manner as the synaptic action of a neural circuit by giving different power spatial distribution to an input signal consisting of a combination of different waveguide modes by an electric deflection effect in a liquid crystal molecular direction.

BRIEF DESCRIPTION OF THE DRAWING(S)

For a better understanding of the invention, reference is made to accompanying drawing, in which.

DESCRIPTION OF THE PREFERRED EMBODIMENT

Figure 1:
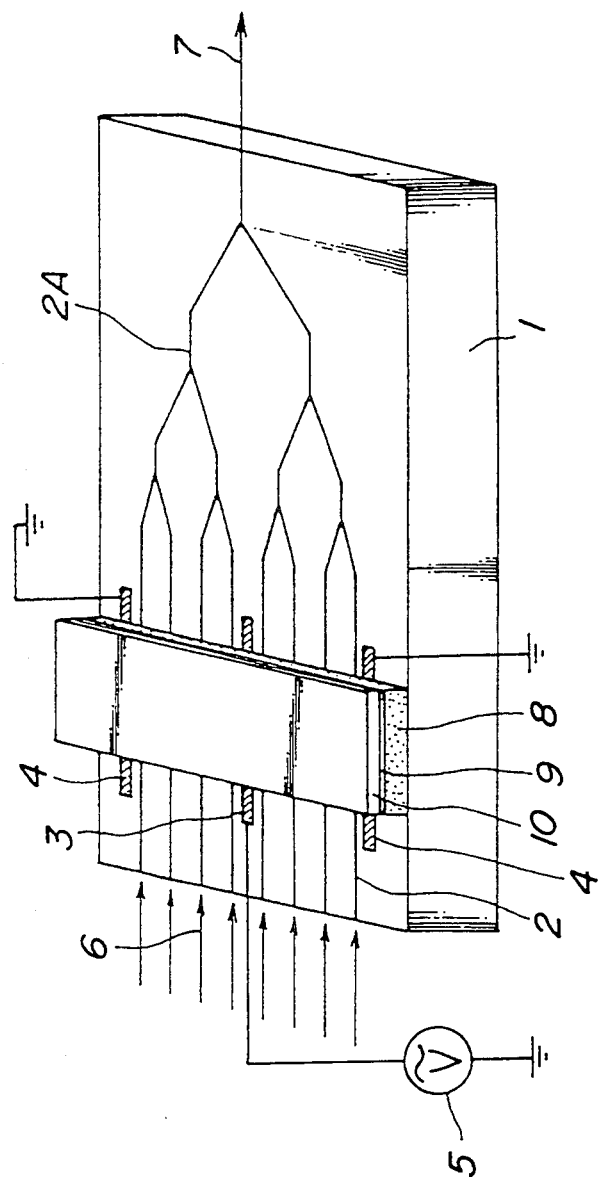
FIG. 1 is a perspective view showing one embodiment of the present invention.

An embodiment of a synaptic weight modulator in accordance with the present invention is shown in FIG. 1. In FIG. 1, multimode channel waveguides 2 are provided on a glass substrate 1, along with a branching waveguide 2A. Electrodes 3, 4 are also provided on the substrate 1 and sandwich the waveguides 2. A nematic liquid crystal cladding layer 8 is disposed perpendicularly to the waveguides 2 and the electrodes 3, 4. A molecular orientation film 9 is provided on the other side of the nematic liquid crystal cladding layer 8 and is fixed to a glass substrate 10. Reference number 5 identifies an A.C. control power supply 5 which is connected to the electrode 3. Optical input signals 6 are supplied to the modulator and an optical output signal 7 is produced by it.

The multimode channel waveguides 2 are formed on the surface of the glass substrate 1 by a selective ion exchange method, and metal film electrodes 3, 4 are fixed on the substrate 1 on both sides of the multimode-channel waveguides 2.

A signal vector consisting of a combination of waveguide modes is introduced into the modulator by a technique such as directional coupling or the like. Respective coupling weights are given to each input signal by modulating the mode power propagating through the channel waveguide 2 with the aid of an electric molecule deflection effect of the liquid crystal cladding layer 8. Each of the modulated signals is then superimposed to provide the output signal 7 by the branch waveguide 2A and the signal is transmitted as one component of the output vector.

Such an action of the present invention corresponds to the action of a neural model in principle. When such devices are connected by optical fiber, it is possible to construct a neural network.

The thin film electrodes 3, 4 are formed on the glass substrate 1 by vacuum deposition and photolithographic technique.

Figure 2:
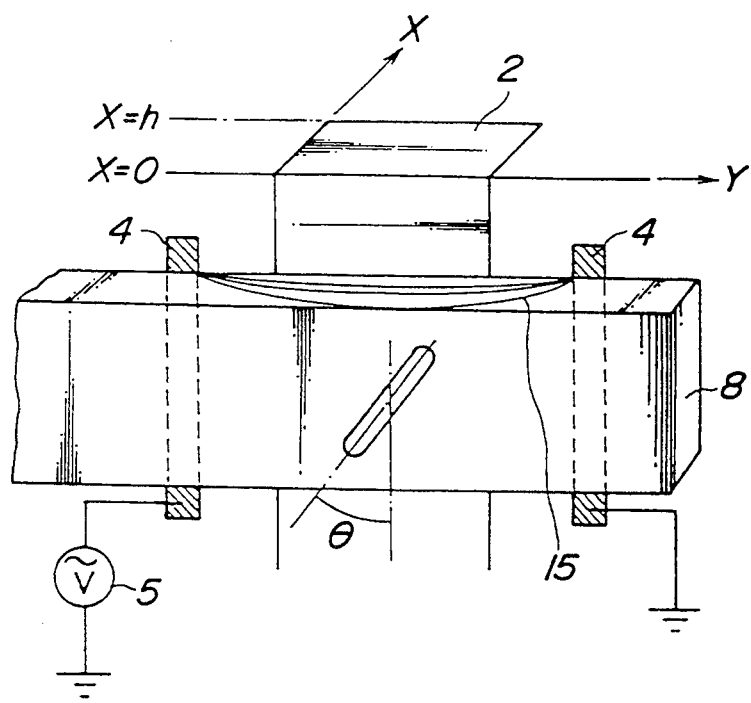
FIG. 2 is a perspective view useful for explaining the operation of the present invention, a part of the system of which is shown in FIG. 3.
Figure 3:
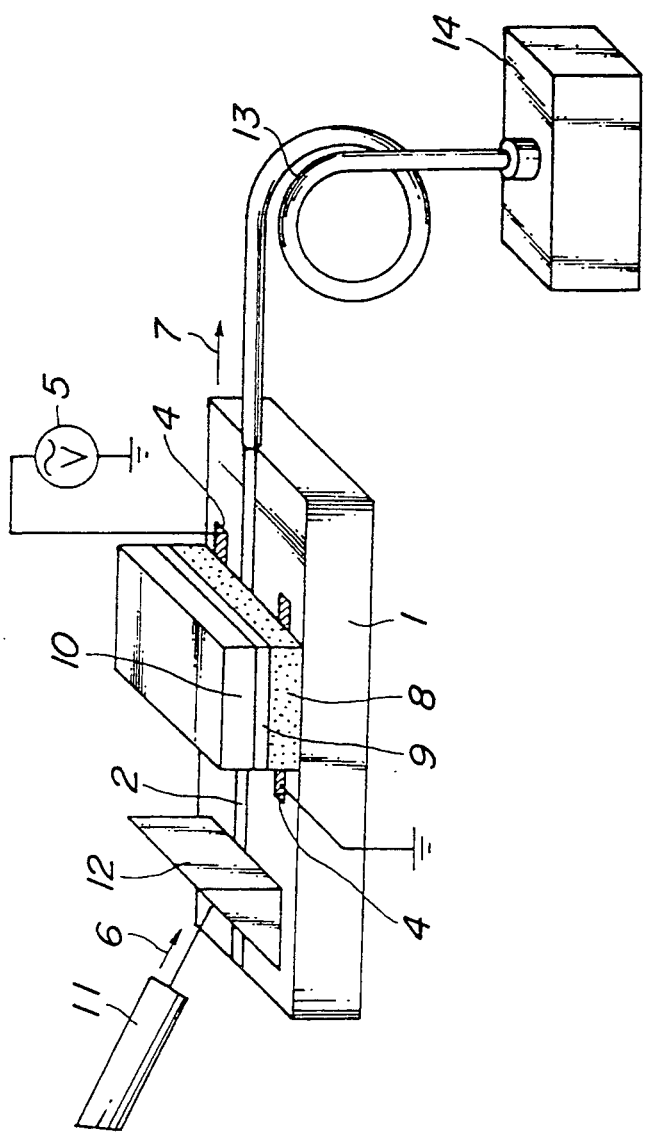
FIG. 3 is a perspective view showing a further embodiment of the present invention.

FIGS. 2 and 3 are views for explaining the principle of the present invention.

As shown in FIG. 2, on the surface of a BK7 optical glass substrate 1 is formed a multimode (i.e. five TE modes) channel waveguide 2 which is 20 μm in width by a selective Ag+ ion exchange treatment at 300° C.

for 1 hour through metal patterning. Al thin film electrodes 4, 4 are formed on both sides of the channel at an interval of 80 μm by photolithographic processing. The nematic liquid crystal material used for cladding layer 8 is MERCK ZLI-2293. Cladding layer 8 is 5 μm in thickness and 3 mm in length. The liquid crystal molecules are oriented along the channel by a rubbing method.

In FIG. 3, 11 is a helium-neon (He—Ne 632.8 nm) light source, and 12 is a prism coupler. Deflected laser light having a wavelength of 632.8 nm from the He—Ne light source 10 is introduced into into the ion exchange multimode channel waveguide 2 by the prism coupler 11.

The liquid crystal molecules are rotated by an external electric field perpendicular to a rubbing direction. The deflection angle $\theta$ of the liquid crystal molecules depends on an anchoring force and electric flux lines 15 (see FIG. 2). The deflection angle $\theta$ is controlled by controlling the applied voltage.

When conducting experiments, with an He—Ne deflection laser light source 11 having wavelength of 632.8 nm, five TE modes were excited, respectively, by a prism coupler 12. Output was detected by a photomultiplier tube 14 (a photo-detection element) through a multimode optical end surface connector 13 at an output terminal.

Figure 4:
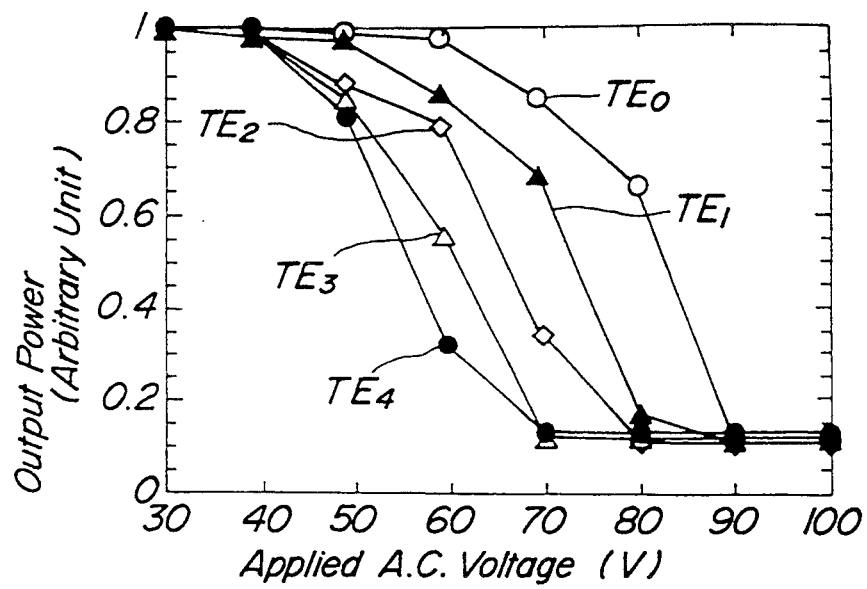
FIG. 4 is a graph showing the relation between output power of various TE modes and applied A.C. voltage.
Figure 5:
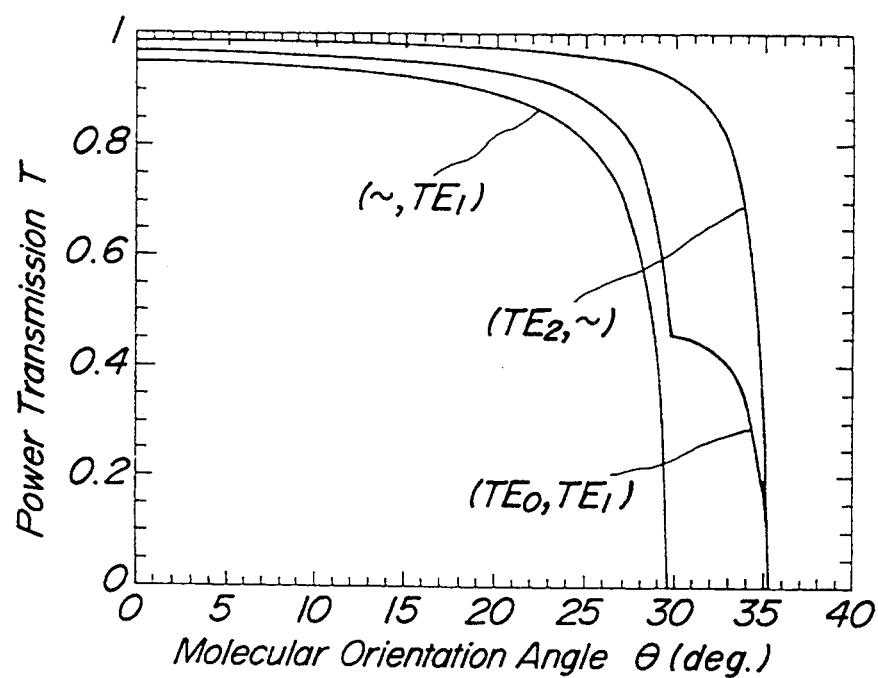
FIG. 5 is a graph showing the relation between the angle $\theta$ between the direction of a multichannel waveguide and the axis of an NLC orientation film and the power transfer ratio T of signals encoded as ($TE_0, \sim$), ($\sim, TE_1$) and ($TE_0, TE_1$).

A power modulation experiment for each mode was conducted by applying a low frequency voltage of 30 Hz, and the experimental result is shown in FIG. 4. The result coincides with a theoretical analysis as shown in FIG. 5. In FIG. 5, which shows the theoretically analyzed results, the abscissa axis represents the deflection angle $\theta$ and the ordinate axis represents the power transfer ratio T. It became clear from FIG. 5 that even if the same voltage is applied, a synaptic effect for giving different weights is imparted to a signal consisting of a combination of different device wave guide modes.

The principle of a weight apply operation when a nematic liquid crystal cladding layer is combined with a multimode waveguide is as follows.

An experiment was conducted for confirming a synaptic effect of a waveguide having a nematic liquid crystal cladding layer for optical neural computing.

For raising the mode encoding capacity of the input signals and the parallelism of the experimental device, one of the channels has to be a multimode waveguide. There are several channel waveguides 2 between a pair of electrodes 3, 4 as shown in FIG. 1. (That is, the space between each set of two electrodes should be relatively large.) As is known, typical electrooptical crystals (e.g., $LiNbO_3$) can provide a relatively fast response, but the extinction ratio becomes lower as the space between two electrodes or the mode order increases. In this case, a very high contrast ratio can still be obtained through the use of a geometry in which the active medium bounded by the waveguides is a liquid crystal. This results from the fact that the liquid crystal exhibits a large optical anisotropy with its molecular axis oriented. Just for this reason, the present inventors concentrated on a nematic liquid crystal (NLC) as the active medium cladding layer 8. As is shown in FIG. 2, the molecular axis of a nematic liquid crystal (NLC) on a passive waveguide is deflected under the action of an anchoring force along the direction of the channel and an electric force slightly short of being along the Y-axis. The deflection angle $\theta$ is dependent on the electric force. The anchoring force dependence of the nematic liquid crystal (NLC) of about 10 nm thickness abutting the waveguide surface may be neglected because of the fact that the evanescent electric field of the guided mode is over the range of about $0.4\lambda \simeq 250$ nm in the nematic liquid crystal clad. For simplicity, the present inventors assume that the width of the channel waveguide 2 is sufficiently large compared to its thickness to be able to divide the guide modes into transverse electric (TE) or transverse magnetic (TM) polarized waves, and give only the analysis for the TE modes because a similar analysis can be adopted for the TM modes.

When the molecular axis of the liquid crystal is oriented parallel to the surface, the TE waves are influenced by the clad refractive index $\eta c$ of the liquid crystal cladding layer 8 as shown by the following equation:

$$\eta c = \eta_{\parallel} \eta_{\perp}(\eta_{\perp}^2 \sin^2\theta + \eta_{\parallel}^2 \cos^2\theta)^{-\frac{1}{2}} \quad (1)$$

where, $\eta_{\parallel}$ and $\eta_{\perp}$ are the refractive indices of the liquid crystal parallel and perpendicular to the molecular axis, respectively, and $\theta$ is the angle between the molecular axis and the direction of the channel waveguide 2.

An input signal which is encoded by TE mode alignments and propagates along the Z-axis is taken as output power $P_{out} = P_z + P_w$ (where, $P_z$ and $P_w$ are the power transmitted in the substrate and waveguide, respectively) on the assumption that the substrate is a lossless medium. The power transfer ratio T depends on the cladding refractive index $\eta_c$. The outputs, hence, are modulated in accordance with the orientation of the molecular axis of the liquid crystal material.

As a numerical example, the present inventors considered a specific case in which the nematic liquid crystal (NLC) cladding layer 8 was MERCK ZLI-2293, deposited on the channel waveguides 2 with an adequate aspect ratio ($\eta_w = 1,540$, h = 5 μm) embedded into a BK7 glass substrate 1.

($\eta_{\parallel} = 1.630$, $\eta_{\perp} = 1.498$ at 632.8 nm wavelength).

This geometry supports two TE modes at $\theta = 0$. Three inputs which are encoded as ($TE_0$, ~), (~, $TE_1$) and ($TE_0$, $TE_1$) by use of a predetermined method (that is, the waveguide directional coupling technique and the like) were propagated along three parallel channels, respectively. The calculation results are shown in FIG. 5. Here, the input power of each mode has been normalized as $$A_m^2 = 1$$

and it will be seen that different input signals exhibit differences in the power transfer ratio at different molecular orientation angles $\theta$. In other words, controlling the molecular orientation direction of the liquid crystal bounded by the waveguides can weight the guided wave signals. This waveguide configuration thus exhibits the functions of a neural synapse. (See FIG. 5)

The experiment supporting the above analysis was conducted with a device as shown in FIG. 3. A channel waveguide 2 with a 20 μm width was fabricated on a BK7 glass substrate 1 by an Ag ion-exchange process at T = 300° C. for 1 hour in an $AgNO_3$ solution. Five TE modes were employed whose effective indices measured with the prism-coupling method were 1.586, 1.571, 1.556, 1.543 and 1.531, respectively, at a 632.8 nm wavelength. A pair of thin film electrodes 4,4 formed by the photolithographic lift-off technique and with a spacing of 80 μm was made of evaporating aluminum. The nematic liquid crystal (NLC) material for cladding layer 8 was MERCK ZLI-2293, which was poured into a 5-μm-thick box formed with the substrate 1 and the upper glass plate 10 whose surface was coated with the directional thin film RN-710. By use of the rubbing method, the molecular axis of nematic liquid crystal NLC was oriented in the direction parallel to the channel of the waveguide. The NLC cladding length along the direction of the same channel was 3 mm. A He—Ne laser light (632.8 nm) from the light source 11 shown in FIG. 3 was coupled into the channel waveguide 2. Any of the TE modes could be chosen, except those that are cut off, by shifting the input angle. The output was received with a photomultiplier 14 through the multimode fiber end surface coupler 13 as a vertical coupler. A low frequency voltage of 30 Hz was used for operating the device. The observations using a polarizing microscope showed that the deflection of the molecular axis begins at about 25 V.

The measured results are summarized in FIG. 4 in which output power has been normalized. Just as shown in FIG. 4, the device can modulate continuously the output power of the different modes throughout the range of 50-90 V and with different weight, and a high-order mode passes cutoff earlier than a low-order mode as the voltage increases. These experimental results confirmed the above theory.

As a conclusion, the present inventors confirmed that a multichannel waveguide combined with an NLC cladding layer provide an optical integrated neuron mode that, as an element of a weighting matrix, it is applicable to the construction of a neural network for neural optical computing. In this mode the input channels are made of parallel channel waveguides, the inputs are signals that are encoded by mode alignments, the output is an optical superposition of the signals which is performed in the branching waveguides, and an electrically controlled nematic liquid crystal cladding layer is used. The above theoretical analysis confirmed that this geometry can give input signals variable weights through control of the direction of the liquid crystalline molecules, much as a neural synapse can give information on a weight change. Although this effect is shown indirectly, it will be apparent that the validity of the analysis is confirmed by the present experiment.

The present invention confirmed the synaptic effect of the optical waveguide modulator with the use of a nematic liquid crystal as cladding material and also confirmed that this device as an optical neural model element can be used to construct an optical neural network.

What is claimed is:

1. An optical waveguide type synaptic weight modulator for use with a control power supply, comprising:
   a glass substrate;
   a multichannel waveguide provided on the glass substrate, the waveguide having an input portion with a plurality of channel waveguides, an output portion, and a branching portion which connects the input and output portions; and
   weighting means for weighting input signals which have different waveguide modes and which are introduced into the input portion of the waveguide so as to generate a weighted output signal at the output portion of the waveguide, the weighting means including
   electrodes provided on the glass substrate, the channel waveguides passing between the electrodes, the electrodes being connected to the control power supply,
   a nematic liquid crystal cladding layer provided over the channel waveguides and the electrodes, and
   an orientation film contacting the nematic liquid crystal cladding layer.

2. An optical waveguide type synaptic weight modulator according to claim 1, wherein the electrodes are elongated and disposed parallel to the channel waveguides, and wherein the nematic liquid crystal cladding layer is elongated and disposed perpendicular to the electrodes and the channel waveguides.

3. An optical waveguide type synaptic weight modulator according to claim 1, further comprising a prism coupler on the input portion of the waveguide.

4. An optical waveguide type synaptic weight modulator according to claim 1, further comprising a photomultiplier tube and a multimode fiber with an end surface coupling connected to the output portion of the waveguide, the multimode fiber conveying the weighted output signal to the photomultiplier tube.

* * * * *